United States Patent [19]

Howorth

[11] Patent Number: 4,996,910
[45] Date of Patent: Mar. 5, 1991

[54] STERILE AIR TROLLEY

[76] Inventor: Frederick H. Howorth, Ollerton Hall, Chorley, Lanchashire, England, PR6 8BG

[21] Appl. No.: 451,151
[22] Filed: Dec. 15, 1989

[30] Foreign Application Priority Data

Dec. 21, 1988 [GB] United Kingdom ................ 8829845

[51] Int. Cl.⁵ .............................................. F23J 11/00
[52] U.S. Cl. .................................... 98/115.1; 98/115.3
[58] Field of Search ....................... 98/36, 115.1, 115.3

[56] References Cited

U.S. PATENT DOCUMENTS

| | | | |
|---|---|---|---|
| 3,251,177 | 5/1966 | Baker | 98/115.1 X |
| 3,336,855 | 8/1967 | Messina | 98/115.3 |
| 3,426,512 | 2/1969 | Nesher | 98/115.3 X |
| 3,498,032 | 3/1970 | Scott | 98/115.3 X |
| 4,016,809 | 4/1977 | Austin | 98/115.3 |
| 4,531,956 | 7/1985 | Howorth | 98/36 X |

FOREIGN PATENT DOCUMENTS 778321 7/1957 United Kingdom ............... 98/115.1

Primary Examiner—Harold Joyce
Attorney, Agent, or Firm—Wall and Roehrig

[57] ABSTRACT

A sterile zone is provided above a horizontal working surface of a mobile casing by provision of an upstanding top section fitment having perforated walling. A fan inside the casing draws air in through lower inlets, and through filters, and clean air passes out via the perforated fitment walling. A major portion of the air flow is preferably directed across the working surface by provision of larger perforations in the fitment wall region which faces that surface and/or by provision of curving air deflector plates inside the top section. Airflow at a lower level from the remainder of the top section prevents any inflow or entrainment of contaminents to the sterile zone.

7 Claims, 3 Drawing Sheets

STERILE AIR TROLLEY

TECHNICAL FIELD

This invention relates to a sterile air trolley for provision of a sterile air zone, including a work surface, free from airborne microbial or particulate contaminents.

BACKGROUND ART

Such a trolley, which comprises a mobile casing, is particularly useful in surgical operating theatres to provide, at any desired location, a sterile surface on which surgical instruments and associated items can be unwrapped and laid. Additionally, by suitable positioning, such a trolley can function to minimise, indeed substantially prevent, airborne contamination of the operating site (wound) as well as gloved hands, gowns, drapes etc. which are introduced into the area of the operating site. Of course, other applications of such a trolley are possible, for example in providing a local sterile area for purposes of pharmaceutical or electronic production steps where a full clean room environment is not available or needs to be supplemented. A sterile air trolley has been previously proposed in UK patent specification No. 2108846. In that proposal an upper region of the trolley extended laterally beyond the lower region and outlets for sterile air were distributed throughout that upper region, including the upper surface thereof, which provided the sterile surface for placement of instruments.

OBJECT OF THE INVENTION

It is an object of the present invention to provide an improved design of sterile air trolley whereby a perforated working surface and laterally overhanging portions can be avoided - neither of these features being favourable to economic production of the trolley, or to ease of maintaining necessary high standards of cleanliness through its working life.

SUMMARY OF THE INVENTION

According to the present invention a sterile air trolley comprising a mobile casing providing a substantially horizontal working surface and having one or more inlets in its lower region and a plurality of air outlets in its upper region, and an impeller enclosed within the casing and operative to move air in through said inlet or inlets, through a filter, and out of the casing by way of the outlets is characterised in that the upper region of the casing is in the form of a top section having side walling which extends upwardly from said working surface, and in that the air outlets are distributed over at least a part of said top section side walling so that actuation of the impeller causes lateral air flow from said side walling to sweep across said working surface.

Preferably the top section is in the form of a detachable fitment. This facilitates assembly, repair, cleaning and replacement.

Preferably, the air outlets are distributed throughout the top section side walling so as to prevent ambient air entrainment (i.e. peripheral inflow of surrounding air carrying contaminents to the zone intended to be kept sterile). For the same reason, the top section preferably also has air outlets distributed throughout its upper walling.

Advantageously, in practical embodiments of the trolley, special measures should be taken to ensure that a major proportion of the air entering and issuing from the top section is directed across the working surface, so that the extent of the sterile zone there is maximized, the air issuing in other directions merely being sufficient to prevent ambient air entrainment, as just mentioned. One measure to accomplish this is to have the air outlets vary in size from one part of the top section to another part so that air outflow therefrom is graded. In this respect, outlets facing across the working surface will be larger than others so that air flow directed across the working surface is at a higher velocity than air flow in other directions.

A further measure, additional to or as an alternative to the foregoing, is to have one or more arcuate plates mounted inside the top section, each plate constituting a curved baffle which guides upflowing air outwardly in a direction across the working surface, preferably in a substantially horizontal direction. The plate or plates may have flanges at each side to enhance this directional effect, i.e. reduce air flow out at the sides.

In a further development, side panels may optionally be mounted on the working surface, extending from the top section walling. These panels act to some extent as baffles, serving to maintain the direction of air flow, and define the working area of greatest sterility. They also further reduce the risk of entry into that area of airborne contaminents from the surrounding air.

BRIEF DESCRIPTION OF THE DRAWINGS

The invention will be described further, by way of example, with reference to the accompanying drawings, in which.

DETAILED DESCRIPTION OF PREFERRED EMBODIMENT

Figure 1:
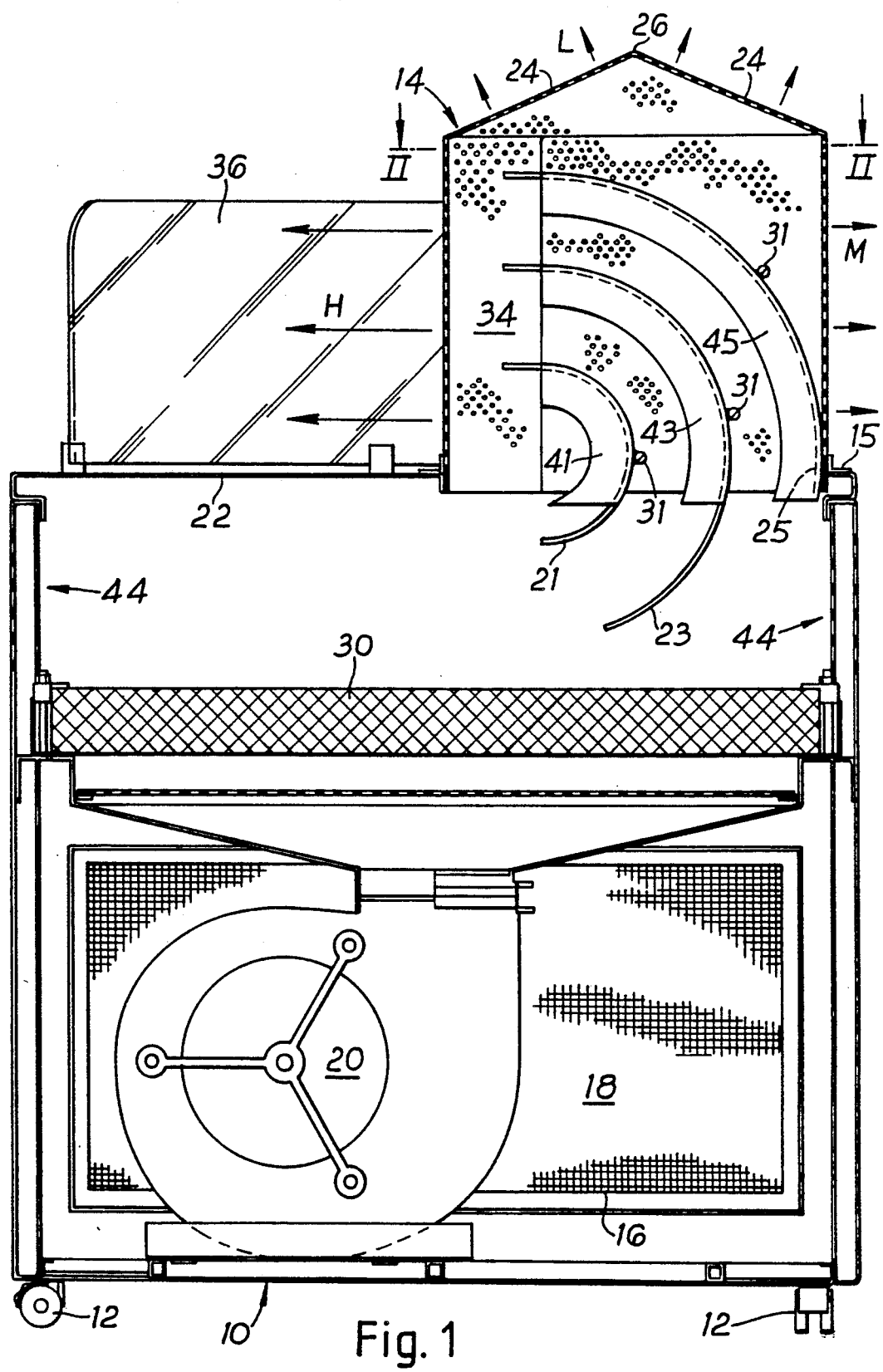
FIG. 1 is a schematic cross-section of a preferred embodiment of the sterile air trolley of the invention.

As shown, this particular construction of trolley comprises a mobile casing in the form of a lower box-like housing 10 supported upon castors 12 and a detachable fitment 14 constituting a top section from which sterile air is discharged.

The housing 10 has air inlets 16 located adjacent the lower edge of each of its four side walls and respective pre-filters 18 are mounted over these inlets 16 inside the housing 10. Also inside the housing 10 is an impeller in the form of a motor-driven fan 20 and, arranged across the housing, above the fan, a HEPA (high efficiency particulate air) filter 30. A silencer is also provided, but not illustrated. The castors 12 are located at the respective corners of the housing 10.

The housing 10 has a substantially horizontal and continuous (imperforate) upper surface 22 which, upon operation of the trolley, constitutes a sterile working surface. However, the surface 22 does not extend the entire area between the top edges of the housing side walls and a large opening remains towards the rear, over which the top section fitment 14 is installed. In this respect, the lower edge margin of the top section fitment 14 fits snugly into the opening, whilst an external ledge, provided by an encircling L-section strip 15 spaced a short distance above the lower edge, rests on the edge margins of the housing 10 which define said opening. Clips or bolts may additionally or alternatively be employed. In an alternative embodiment the fitment 14 may fit over an upturned rim around the opening at the top of the housing 10.

Figure 2:
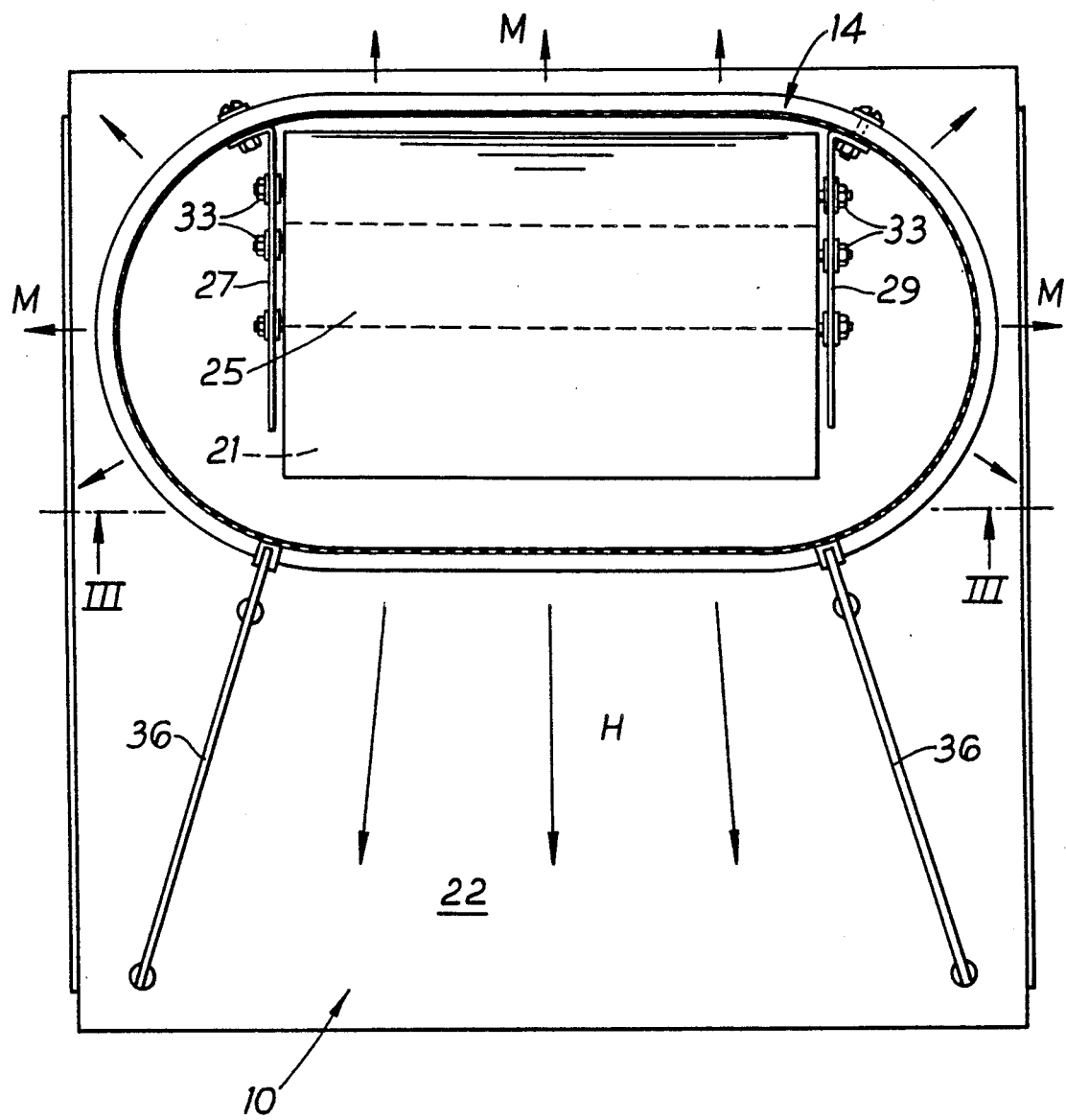
FIG. 2 is a plan view of the trolley shown in FIG. 1, with the top section sectioned along the line II—II in FIG. 1 to show the structures mounted inside.

The top section 14 in the illustrated embodiment is a structure, defining a diffusion chamber 34, which is oblong in transverse cross-section, as shown in FIG. 2. Its precise shape is not critical and in alternative embodiments the top section could equally well be circular or rectangular. It has upper walling in the form of two symmetrical regions 24 sloping from a central ridge 26. Air outlets in the form of apertures which may be circular, oval or rectangular, or may be provided by wire mesh or woven fabric mounted on a framework are distributed over the entire side walling and upper walling 24 of the fitment 14. The size of the apertures in the upper walling 24 is smaller than that of the apertures in the side walling, so air flow from the top of the fitment 14 will be lowest, as indicated by the arrows labelled L in FIG. 1. In the side walling of the fitment 14, the apertures in the lower region of the wall section facing towards the surface 22 are of larger size than the remainder of apertures in the side walling so the velocity of air flow therefrom is higher, as indicated by the arrows labelled H in both FIGS. 1 and 2. The remaining air flow is labelled M indicating an air flow velocity intermediate the aforesaid extremes issuing from the medium size apertures distributed over the remainder of the side walling.

Inside the fitment 14, three arcuate deflector plates 21, 23, 25 are mounted, as shown in all the drawings. These plates curve from the opening at the bottom of the fitment 14 towards the front walling, which faces the work surface 22. Two vertically disposed, perforated mounting plates 27, 29 are mounted onto the rear walls of the fitments 14 and extend towards, but end short of, the front wall. The arcuate plates 21, 23, 25 (which of course are imperforate) are mounted between these vertical plates 27, 29, by means of respective threaded shafts 31 which are welded to said plates 21, 23, 25, and by means of nuts 33. The positioning of the plates 21, 23, 25 can readily be changed as the shafts 31 can be inserted through any selected perforations in the mounting plates. Angular adjustment is also simply accomplished by loosening the nuts 33. In this particular embodiment the three plates 21, 23, 25 are disposed concentrically, one behind the other, i.e. the plates 23, 25 to the rear are of respectively greater radius. At each side, adjacent the mounting plates 27, 29, the plates 21, 23, 25 have flanges 41, 43, 45 which are directly inwardly with regard to the curvature of the plates (i.e. from their concave faces).

When the fan 20 is actuated, air is drawn into the chamber inside the housing 10 through the prefilters 18 of the inlets 16, and after passing through the fan 20 itself the air is driven upwards through the filter 30, into the diffusion chamber 34 and out of the apertures of the top section 14. In this respect the arcuate plates 21, 23, 25 serve as baffles and direct a major proportion of the air towards and out of the front face of the fitment 14, and across the working surface 22 in a substantially horizontal pattern. The flanges 41, 43, 45 assist in reducing air flow out of the sides of the passageways between the plates 21, 23, 25.

In this way, an air flow pattern is established as shown in the drawings, with the dominant flow, of highest velocity being directed across the work surface 22, on which surgical instruments can be placed to maintain their sterility. Indeed, the sterile zone created by this dominant air flow will extend beyond the trolley such that if the trolley is appropriately positioned adjacent an operating site (wound) that also can be rendered aeromicrobiologically clean. This sterilising effect can be enhanced, i.e. the sterile air zone extended, by attaching a surgical drape (not shown) along the edge of the trolley work surface 22, opposite to the fitment 14, and stretching the drape out towards the operating site. The air flow will follow the surface of the drape (Coander effect) and the drape itself will prevent contaminated air flowing in from below.

The additional air flow at low and medium velocities from the remainder of the top section 14 of the trolley is important in preventing entrainment or inflow of surrounding ambient contaminated air, which would otherwise reduce the extent of the sterile zone.

As indicated respective side panels 36 may be fitted to the work surface 22. These panels 36 extend from the top section 14 to define and shield the sterile work zone where surgical instruments may be placed, or any operations requiring sterile conditions may be performed. In the illustrated example, the panels 36 diverge from the top section 14, but this is not essential.

The panels 36 are preferably readily detachable, as is the fitment 14, and the internal baffle arrangement (plates 21, 23, 25, 27, 29). This facilitates cleaning, repair and replacement, as well as adjustment to ensure the best possible air flow pattern for the required extent and reliability of the sterile zone. The panels 36 may not always be required depending on the use to be made of the trolley, and the internal baffle arrangement is not essential, although it is preferred as it enhances the performance of the trolley.

Naturally, other variations in the details of construction of the trolley are possible within the scope of the invention. In particular it should be noted that the work surface 22 may be perforated and the trolley base 10 may include lateral extensions, but such features are unnecessary and probably undesirable on grounds of cost, complexity and problems in maintenance.

Figure 3:
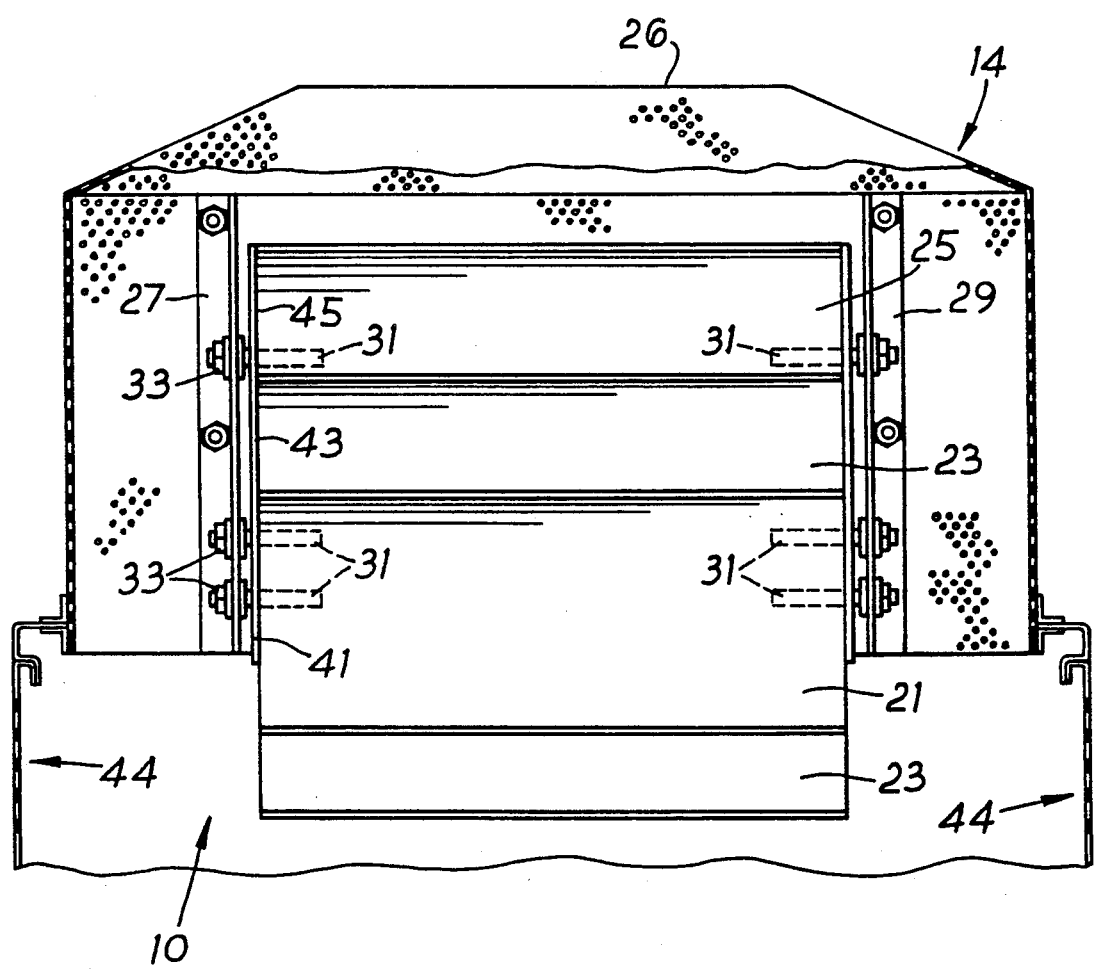
FIG. 3 is a fragmentary sectional view along the line III—III in FIG. 2.

Additional air outlet apertures may, however, with considerable added advantage, be provided in the upper portions of the trolley side walls, above the level of the HEPA filter 30, as indicated by reference numerals 44 in FIGS. 1 and 3. Outflow of air from these apertures 44 will prevent any entrainment of contaminents from below (i.e. any upflow of contaminated air from reaching the work surface 22). Moreover trays for holding instruments can usefully be hooked into some of these apertures 44 to obviate the need for any additional instrument trolleys, and these trays when so affixed will also, to a substantial extent, be within the sterile zone created by the trolley's own air flow pattern. The size of apertures 44 in the trolley side walls can also be appropriately graded, advantageously, largest at the top and smallest lower down.

Finally it should be noted that for some purposes, e.g. pharmaceutical clean zones, a sterile air trolley in accordance with the invention may be provided with two, three, four or more worksurfaces, arrayed around an upstanding perforated top section, or indeed a continuous worksurface encircling a top section, so as to have a considerably enlarged sterile air zone with minimum additional expenditure from a relatively compact piece of apparatus.

I claim:

1. A sterile air trolley comprising:

a mobile casing providing a substantially horizontal, unenclosed working surface and having a lower region provided with inlets;

an impeller enclosed within said casing and operative to draw air in through said inlets;

a filter arranged across said casing above said impeller;

an upper enclosure fitted to said casing and extending upwardly therefrom adjacent said working surface, said upper enclosure having side walling provided with air outlets, and top walling closing off said enclosure at its top and also provided with air outlets, said air outlets being distributed throughout said side and top walling, but being larger in size in the side walling region facing across said working surface; and curving baffle means mounted in said upper enclosure but spaced from said side and top walling thereof to direct air flow from said impeller inside said casing towards said working surface to cause a dominant outflow of air from said air outlets across said working surface, while inducing subsidiary flow of air from the remainder of said upper enclosure to prevent entrainment of contaminants.

2. A sterile air trolley as set forth in claim 1 wherein said upper enclosure is detachable from said casing.

3. A sterile air trolley as set forth in claim 1 wherein said baffle means consist of three imperforate arcuate plates of increasing radius, arranged one behind the other within the upper enclosure.

4. A sterile air trolley as set forth in claim 3 wherein said three plates are each provided with imperforate flanges at each end to further enhance the proportion of air flowing towards said working surface.

5. A sterile air trolley as set forth in claim 1 wherein said baffle means are adjustably and releasably mounted within said upper enclosure between perforate mounting plates.

6. A sterile air trolley as set forth in claim 1 further including respective panels extending from said upper enclosure side walling at opposing sides of said working surface and serving to contain air flow directed across said working surface.

7. A sterile air trolley as set forth in claim 1 wherein said casing is additionally provided with air outlets below said working surface, but above the level of said filter.

* * * * *